United States Patent
Mizuno et al.

(10) Patent No.: US 7,456,807 B2
(45) Date of Patent: Nov. 25, 2008

(54) FLAT PANEL IMAGE DISPLAY UNIT

(75) Inventors: Akira Mizuno, Takatsuki (JP); Masayuki Esaki, Ibaraki (JP)

(73) Assignee: Panasonic Corporation, Osaka (JP)

( * ) Notice: Subject to any disclaimer, the term of this patent is extended or adjusted under 35 U.S.C. 154(b) by 670 days.

(21) Appl. No.: 10/548,717

(22) PCT Filed: May 27, 2004

(86) PCT No.: PCT/JP2004/007661

§ 371 (c)(1),
(2), (4) Date: Sep. 8, 2005

(87) PCT Pub. No.: WO2004/107296

PCT Pub. Date: Dec. 9, 2004

(65) Prior Publication Data

US 2006/0197721 A1     Sep. 7, 2006

(30) Foreign Application Priority Data

May 29, 2003   (JP)   ............................. 2003-152530

(51) Int. Cl.
*G09G 3/28* (2006.01)
(52) U.S. Cl. .................. 345/60; 345/901; 361/681
(58) Field of Classification Search ........... 345/1.1–1.3, 345/60–67, 102, 901–905; 361/681–683
See application file for complete search history.

(56) References Cited

U.S. PATENT DOCUMENTS

| | | | | |
|---|---|---|---|---|
| 5,280,372 A | * | 1/1994 | Horiuchi | 349/65 |
| 6,061,104 A | * | 5/2000 | Evanicky et al. | 248/274.1 |
| 6,477,039 B2 | * | 11/2002 | Tajima | 361/681 |
| 7,362,338 B1 | * | 4/2008 | Gettemy et al. | 345/629 |
| 2002/0093794 A1 | * | 7/2002 | Quardt et al. | 361/726 |

(Continued)

FOREIGN PATENT DOCUMENTS

JP     9-6479 A     1/1997

(Continued)

OTHER PUBLICATIONS

International Search Report for PCT/JP2004/007661, dated Sep. 14, 2004.

*Primary Examiner*—Richard Hjerpe
*Assistant Examiner*—Kimnhung Nguyen
(74) *Attorney, Agent, or Firm*—RatnerPrestia

(57) ABSTRACT

A flat panel image display unit such as a plasma display device is provided having a structure of signal input terminals that is adaptable flexibly to a plurality of different kinds of video signals. The image display unit includes a flat display panel, a display drive circuit block, an input signal circuit block connected between the display drive circuit block and an external apparatus for outputting a video signal, and an enclosure for housing the above components. The input signal circuit block includes a plurality of different kinds of board blocks provided replaceably according to a plurality of different forms of signals. A casing member is placed inside the enclosure and is provided with an insertion opening for accepting insertion of any of the board blocks. A guide rail is for positioning the board block to a predetermined position. The plurality of guide rails are provided according to the board block of a smallest unit size.

6 Claims, 11 Drawing Sheets

U.S. PATENT DOCUMENTS

| | | | |
|---|---|---|---|
| 2002/0097554 A1* | 7/2002 | Hardin et al. | 361/683 |
| 2003/0030978 A1* | 2/2003 | Garnett et al. | 361/687 |
| 2004/0125549 A1* | 7/2004 | Iredale | 361/681 |
| 2004/0130865 A1* | 7/2004 | Vanderheyden et al. | 361/685 |

FOREIGN PATENT DOCUMENTS

| | | |
|---|---|---|
| JP | 2002-41186 A | 2/2002 |
| JP | 2003-108026 A | 4/2003 |

* cited by examiner

FLAT PANEL IMAGE DISPLAY UNIT

THIS APPLICATION IS A U.S. NATIONAL PHASE APPLICATION OF PCT INTERNATIONAL APPLICATION PCT/JP2004/007661.

TECHNICAL FIELD

The present invention relates to a flat panel image display unit such as a plasma display device known as a display device of large screen area, thin form and light weight.

BACKGROUND ART

Plasma display devices have been drawing attention recently among various types of flat panel image display units, especially for the reasons that they have capability of displaying at higher speed, wider viewing angle, higher quality of display images, and the like features because they are self-emissive as opposed to liquid crystal panels. Plasma display devices are therefore used as display devices in places where many people gather and in homes for enjoying images in large screens.

Plasma display devices are also used for a variety of applications as large-scale displays. For this reason, the plasma display devices are required to have signal input terminals of such a structure that accepts connections of external apparatuses such as personal computers, television tuners, video players, and the like that output video signals including various forms of data signals.

Therefore, the plasma display devices are provided with a variety of signal input terminals that can connect with many external signal sources. However, ordinary users seldom use all of the signal input terminals, but most of them use the plasma display devices by connecting only certain kinds of external apparatuses. Some of the variety of signal input terminals thus become useless although they are provided for adapting to numerous kinds of apparatuses.

These problems can be dealt with if plasma display devices are manufactured in a plurality of different kinds so that they have different signal input terminals according to the requirements of users. However, this requires manufacturing of many varieties of plasma display devices in order to supply them to the users desiring the variety of different usages described above, and it reduces the manufacturing efficiency.

There is an idea that has been proposed to solve the above problems, that plasma display devices have signal input terminals of such a structure that allows replacement of a part of the signal input terminals.

However, there still is a problem in these plasma display devices that they are not flexibly adaptable to a plurality of different kinds of video signals.

SUMMARY OF THE INVENTION

The present invention relates to a flat panel image display unit including a flat display panel, a display drive circuit block disposed to a chassis member for supplying a signal to the display panel for making display, an input signal circuit block for outputting a video signal to the display drive circuit block, and an enclosure for housing the flat display panel, the display drive circuit block and the input signal circuit block, wherein the input signal circuit block includes a plurality of different kinds of board blocks so provided as to be replaceable according to a plurality of different forms of signals, the board block having a signal output connector detachably connectable to a signal input connector of the display drive circuit block, and a casing member placed inside the enclosure and provided with an insertion opening for accepting insertion of any of the board blocks and a guide rail for guiding and positioning the board block to a predetermined position when the board block is inserted through the insertion opening, and further wherein the plurality of board blocks are prepared in predetermined dimensions as a smallest unit size, and the plurality of guide rails are disposed to the casing member according to dimensions of the board block of the smallest unit size.

DETAILED DESCRIPTION OF PREFERRED EMBODIMENT

Referring now to the accompanying drawings, description is provided hereinafter of a flat panel image display unit according to an exemplary embodiment of the present invention by taking a plasma display device as an example.

Exemplary Embodiment

Description is provided hereinafter of a plasma display device according to this exemplary embodiment with reference to FIG. 1 through FIG. 13. However, the following embodiment of the invention shall be considered as illustrative and not restrictive.

Figure 1:
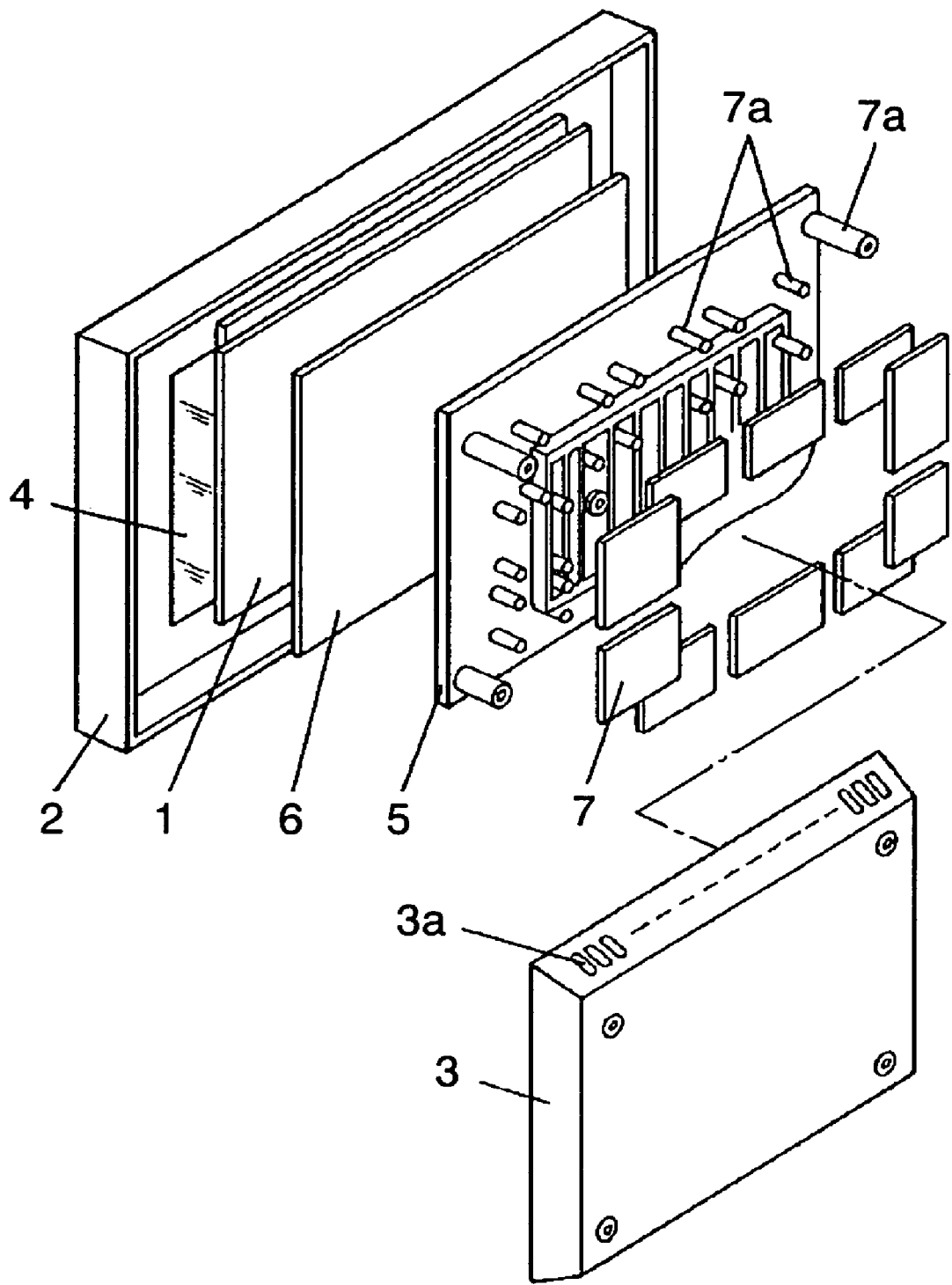
FIG. 1 is an exploded perspective view of a plasma display device according to an exemplary embodiment of the present invention, as viewed from the rear side thereof.

FIG. 1 is an exploded perspective view of a plasma display device according to this exemplary embodiment of the invention, as viewed from the rear side of it. An enclosure for housing flat display panel 1 includes front frame 2 and metal back cover 3, as shown in FIG. 1. Front cover 4 made of a glass or the like material is placed over an opening of front frame 2 to serve as an optical filter in addition to protection of display panel 1. Front cover 4 may be treated with silver deposition, for instance, to suppress undesirable emission of electromagnetic waves. In addition, back cover 3 is provided with a plurality of vent holes 3a for discharging heat generated by display panel 1 and the like components to the outside.

Display panel 1 is secured to a front face of chassis member 5 made of aluminum or the like by bonding it through heat conductive sheet 6. A plurality of circuit blocks 7 for driving display panel 1 are mounted to a back side of chassis member 5. Heat conductive sheet 6 is used for dissipation of the heat generated by display panel 1 to chassis member 5 as it conducts the heat efficiently. Circuit blocks 7 are provided with electric circuits for driving and controlling display of images on display panel 1. Electrode conductors terminated at outer edges of display panel 1 are connected electrically to circuit blocks 7 with a plurality of flexible wiring sheets (not shown) extended over the four side edges of chassis member 5.

Chassis member 5 is provided with bosses 7a integrally formed by die-casting or the like on the back face thereof for mounting circuit blocks 7 and for fixing back cover 3. This chassis member 5 may instead be constructed of an aluminum plate and fixing pins studded to it.

Figure 2:
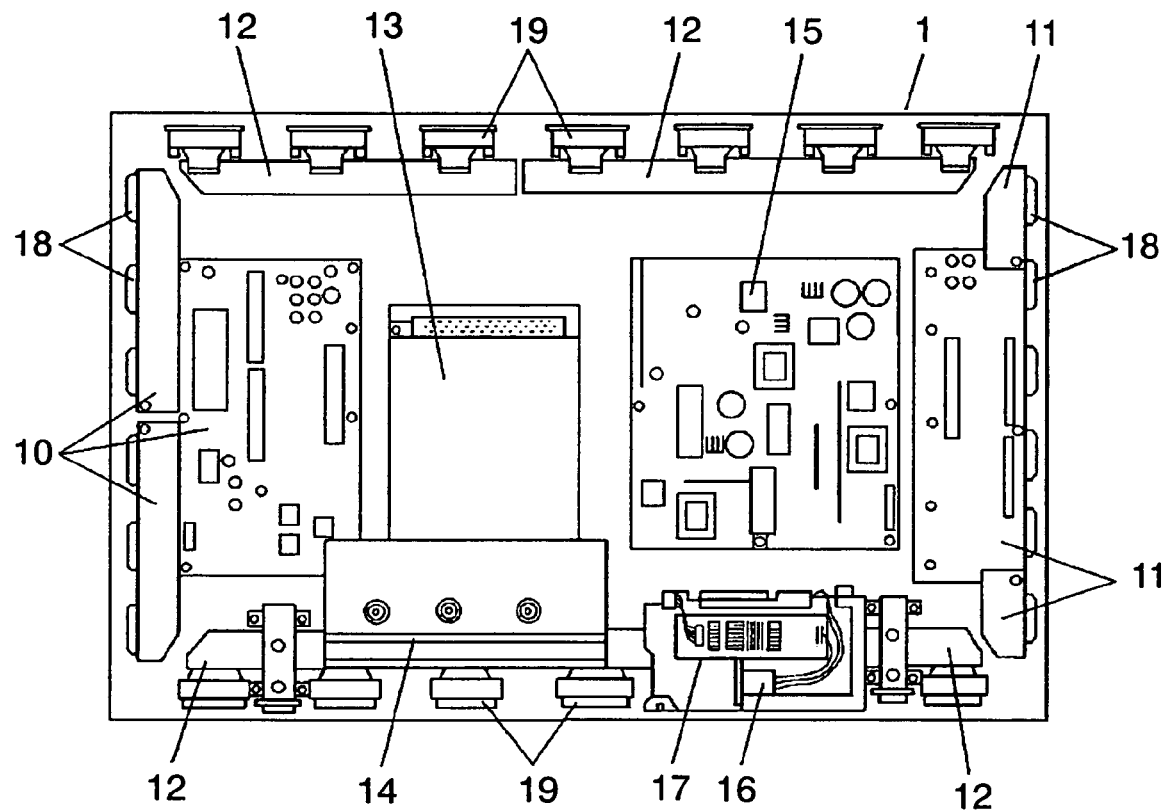
FIG. 2 is a rear side view of the plasma display device with a back cover removed.

FIG. 2 is a rear side view of the plasma display device with back cover 3 removed. Certain circuit elements omitted from FIG. 1 are also shown in detail in FIG. 2. In FIG. 2, scan driver circuit block 10 supplies a prescribed signal voltage to scan electrodes of display panel 1. Sustain driver circuit block 11 supplies another prescribed signal voltage to sustain electrodes of display panel 1. Address driver circuit blocks 12 supply still another prescribed signal voltage to address electrodes of display panel 1. Scan driver circuit block 10 and sustain driver circuit block 11 are individually disposed to each side in the widthwise direction of chassis member 5. Address driver circuit blocks 12 are disposed to both the top side and the bottom side in the vertical direction of chassis member 5.

Input signal circuit block 14 is provided with an input terminal for detachably connecting a coupling cable for connection of an external apparatus such as a television tuner, personal computer, and the like. Input signal circuit block 14 is disposed to chassis member 5 in a manner that it is generally in parallel to display panel 1.

Control circuit block 13 converts video signals delivered from input signal circuit block 14 into image data signals corresponding to a number of pixels of display panel 1, and supplies them to address driver circuit block 12. Control circuit block 13 also generates discharge-control timing signals, and supplies them to scan driver circuit block 10 and sustain driver circuit block 11 respectively to perform display driving control such as color gradation control and the like. Control circuit block 13 is disposed to generally the center area of chassis member 5.

Power supply block 15 supplies a voltage to each of the circuit blocks described above. Power supply block 15 is disposed to generally the center area of chassis member 5 in the same manner as control circuit block 13. Power supply block 15 is supplied with a voltage of commercial power supply through power input block 17 having connector 16 to which a power supply cable (not shown) is attached.

Flexible wiring sheets 18 connect the electrode conductors of the scanning electrodes and the sustain electrodes of display panel 1 to the individual printed circuit boards in scan driver circuit block 10 and sustain driver circuit block 11. Flexible wiring sheets 19 connect the electrode conductors of the address electrodes of display panel 1 to the printed circuit boards in address driver circuit block 12. Flexible wiring sheets 18 and 19 are individually routed from the front side to the back side of display panel 1 by being bent 180 degrees around the outer edges of display panel 1.

FIG. 3 through FIG. 10 show structures of control circuit block 13 and input signal circuit block 14. Description is provided hereinafter of these components in more detail.

Figure 3:
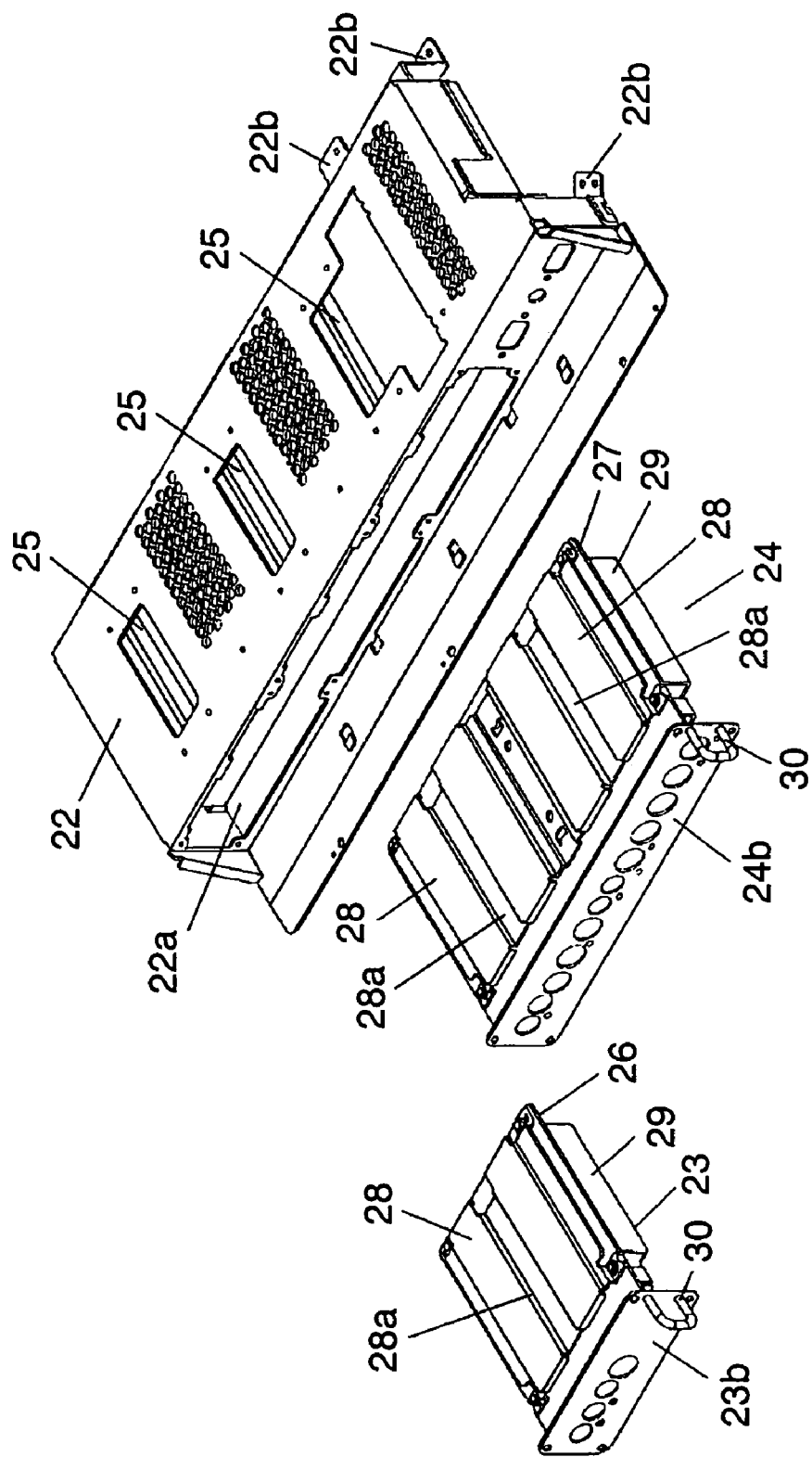
FIG. 3 is a perspective view of an input signal circuit block of the plasma display device before being assembled.
Figure 4:
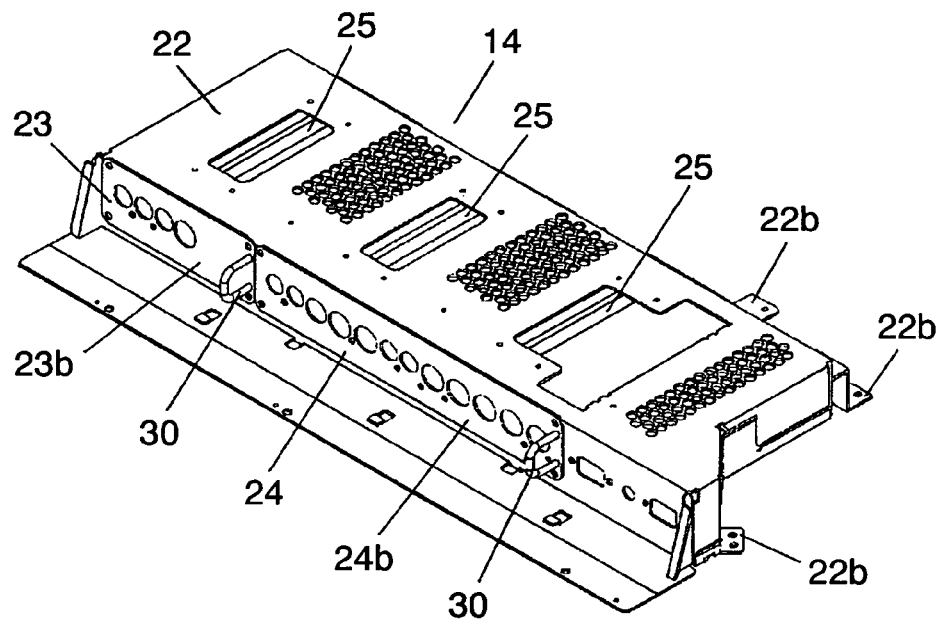
FIG. 4 is a perspective view of the input signal circuit block after assembled.

FIG. 3 is a perspective view of input signal circuit block 14 of the plasma display device before being assembled, and FIG. 4 is a perspective view of input signal circuit block 14 after assembled. Input signal circuit block 14 has a structure, as shown in FIG. 3 and FIG. 4, which includes casing member 22 and board blocks 23 and 24. Casing member 22 is constructed of a sheet metal by a bending process. Casing member 22 has mounting tabs 22b formed integrally on proper locations on one side facing chassis member 5 for mounting it to chassis member 5 with machine screws and the like. Casing member 22 is also provided with insertion opening 22a in a surface orthogonal to the mounting side of it to chassis member 5. Casing member 22 is mounted to chassis member 5 in such a manner that insertion opening 22a is exposed to the outside through an opening (not shown) formed in back cover 3. In the structure of this exemplary embodiment, insertion opening 22a is thus opened to the outside of back cover 3.

Board blocks 23 and 24 are provided with circuit boards 26 and 27 respectively, as well as metallic guide plates 28 and shield plates 29. Each of circuit boards 26 and 27 has components mounted thereto, such as an IC and electric circuit elements that constitute an input signal circuit. Metallic guide plate 28 is mounted to an upper surface of each of circuit boards 26 and 27, and electromagnetically shields the components constituting the input signal circuit. Guide plate 28 has grooved guide section 28a which engages with guide rail 25 attached to an inner wall of casing member 22. Guide section 28a is provided by forming a groove in the fabrication process of guide plate 28. Shield plate 29 electromagnetically shields components mounted to an underside surface of each of circuit boards 26 and 27 for constituting the input signal circuits.

Here, board block 23 is the one having a smallest unit size prepared according to predetermined dimensions. This board block 23 of the smallest unit size is provided with one guide plate 28. On the other hand, board block 24 has a size equivalent to two sets of board block 23 of the smallest unit size connected together, and it is provided with two guide plates 28.

Board blocks 23 and 24 have connectors 23a and 24a for signal output (not shown in FIG. 3 and FIG. 4) and input terminal sections 23b and 24b respectively. Connectors 23a and 24a are provided on the rear side of circuit boards 26 and 27 by electrically connecting and securing their terminals to circuit boards 26 and 27. Input terminal sections 23b and 24b are connected electrically with circuit boards 26 and 27, and placed on the front side of circuit boards 26 and 27. Coupling cables for connection of external apparatuses are connected detachably to input terminal sections 23b and 24b. In addition, each of input terminal sections 23b and 24b is provided with a U-shaped metal bracket 30 for use as a handle of each of board blocks 23 and 24, such that board blocks 23 and 24 are mounted in a removable manner to casing member 22 through insertion opening 22a. In other words, the structure provided in this exemplary embodiment is such that there are plural kinds of board blocks prepared in advance, each having a signal processing circuit of different form, so that board blocks 23 and 24 can be replaced according to the type of video signals.

In addition, casing member 22 includes another input signal block (not shown) provided with an input terminal for detachably connecting a coupling cable for connection of another external apparatus, and this input signal block is normally connected to control circuit block 13.

Figure 5:
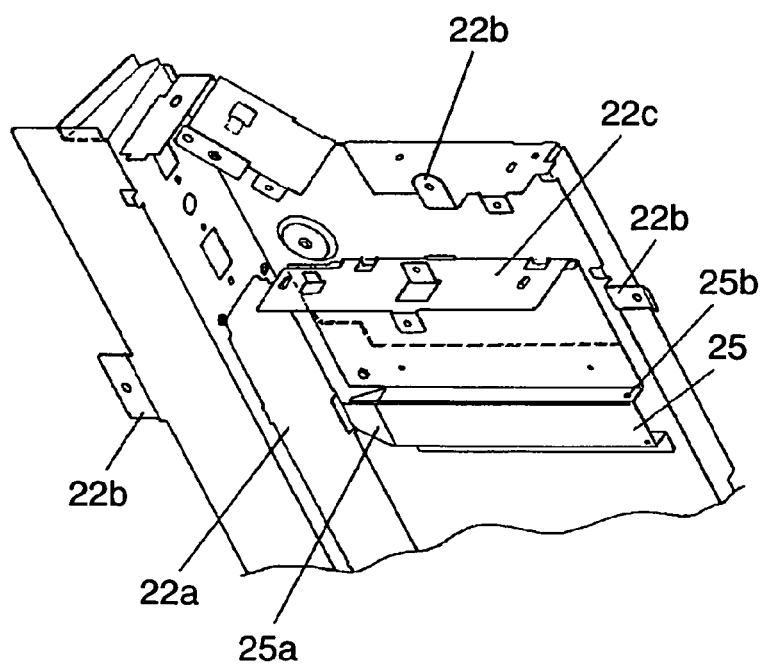
FIG. 5 is a perspective view showing a principal portion of a casing member of the plasma display device.

FIG. 5 is a perspective view showing a principal portion of casing member 22 of the plasma display device. As shown in FIG. 5, guide rail 25 made by bending process of a sheet metal is mounted to the inner wall of casing member 22 in a manner that it extends in a direction orthogonal to insertion opening 22*a*. This guide rail 25 serves to guide board blocks 23 and 24 and bring them into their proper positions when they are being installed into casing member 22 through insertion opening 22*a*.

Guide rail 25 is provided with tapered portion 25*a* which tapers off to one end confronting insertion opening 22*a*, and boss 25*b* on the other end. A plurality of guide rails 25 are mounted to the inner wall of casing member 22 at regular intervals corresponding with board block 23 of the smallest unit size. The exemplary embodiment described here is an example having three guide rails 25 as shown in FIG. 3. However, this should not be considered as restrictive, but casing member 22 can be provided with any number of guide rails 25 according to the sizes of insertion opening 22*a*, board block 23, and the like.

Casing member 22 is also provided with vertical wall 22*c* in the interior side for separating the input signal block from board blocks 23 and 24. Vertical wall 22*c* is formed by cutting a portion of the upper surface of casing member 22 and bending the cut portion inward. This vertical wall 22*c* shields the input signal block electromagnetically.

Figure 6:
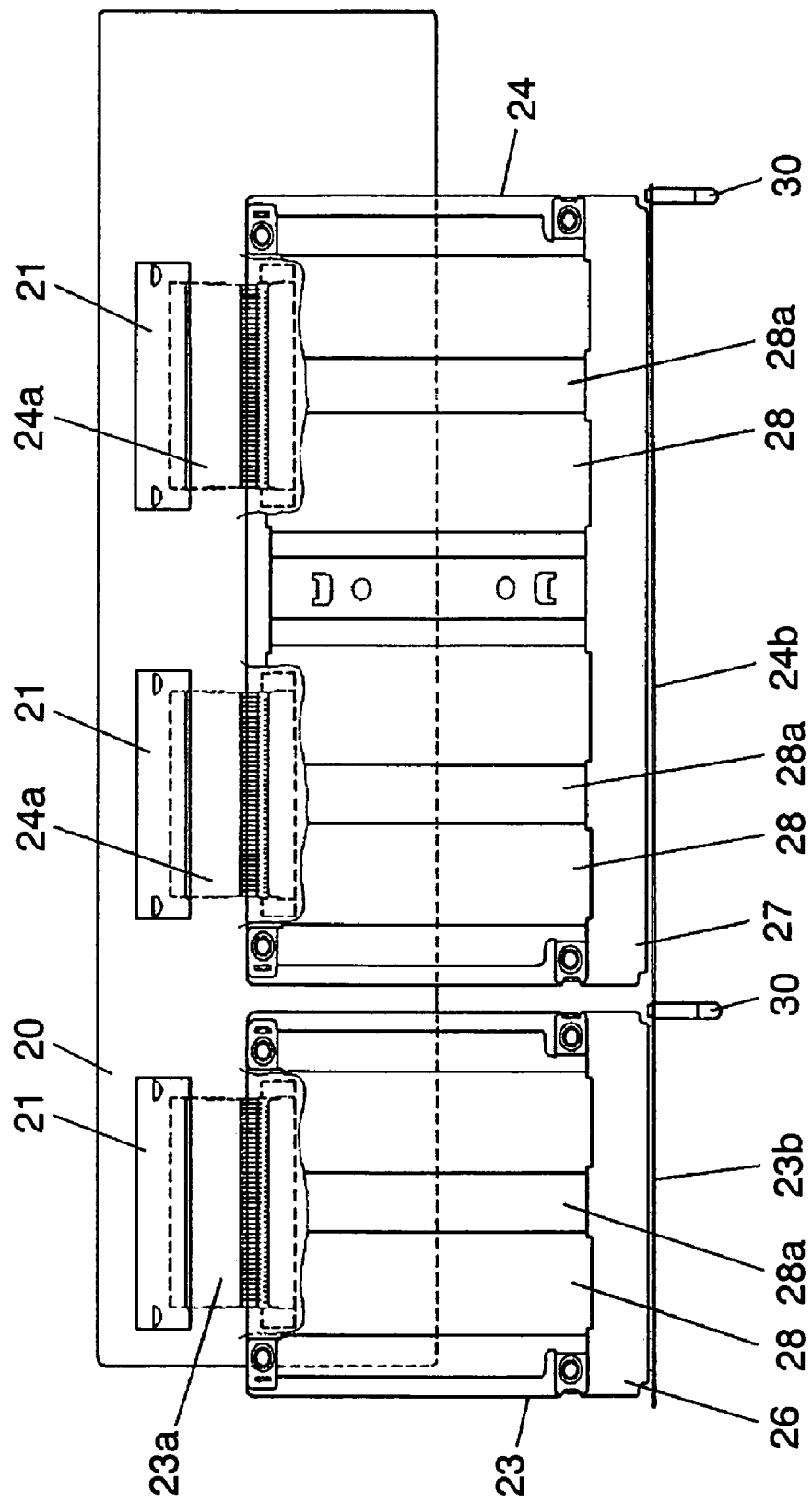
FIG. 6 is a plan view showing a configurational structure inside the input signal circuit block of the plasma display device.
Figure 7:
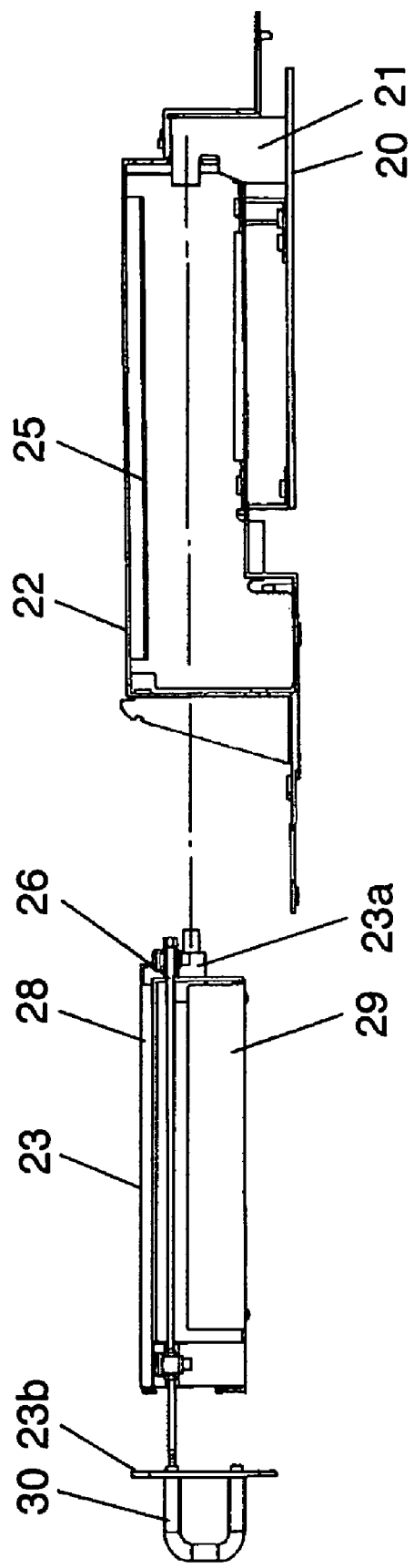
FIG. 7 is a side view of the input signal circuit block of the plasma display device immediately before being assembled.

FIG. 6 is a plan view showing a configurational structure inside input signal circuit block 14 of the plasma display device. FIG. 7 is a side view of input signal circuit block 14 of the plasma display device immediately before being assembled. Circuit board 20 shown in FIG. 6 and FIG. 7 on control circuit block 13 has a microcomputer, driver IC, electric circuit components and the like mounted thereon to compose the certain control circuit described above. Control circuit block 13 is thus constructed. Circuit board 20 is secured to chassis member 5 with machine screws or the like in an orientation generally in parallel to display panel 1. Connectors 21 for signal input are disposed to one side of circuit board 20. Connectors 23*a* and 24*a* are connected in a detachable manner to connectors 21 when board blocks 23 and 24 are inserted into casing member 22, as shown in FIG. 6. In this case, guide rails 25 guide board blocks 23 and 24 in a manner so that connectors 23*a* and 24*a* are connected easily to connectors 21, as described with reference to FIG. 3 and FIG. 5. The signals from input signal circuit block 14 are fed through these connectors 21.

Figure 8:
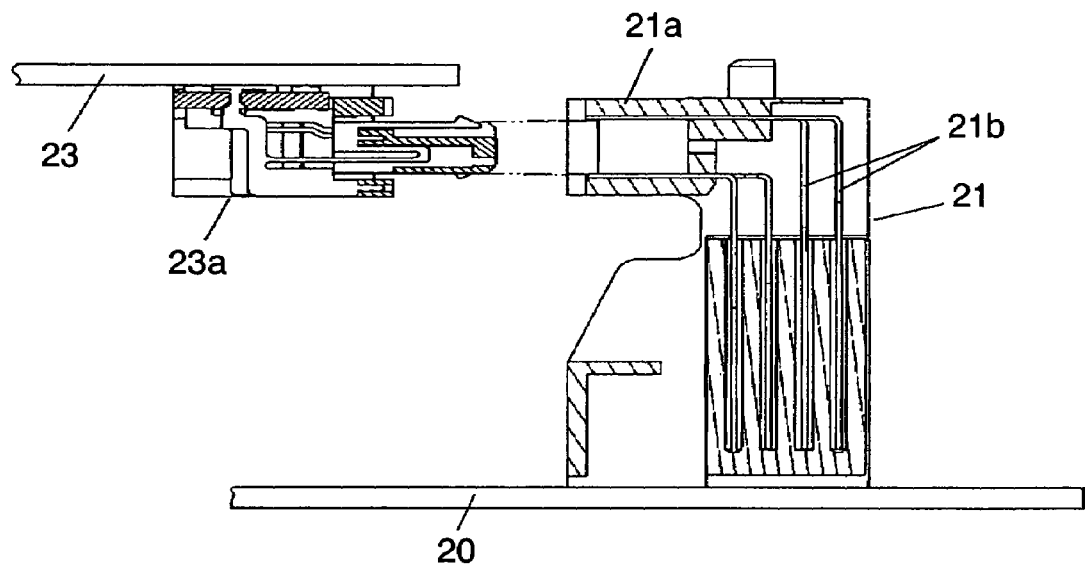
FIG. 8 is an enlarged sectional view showing a portion where a connector of a board block is connected to a connector of a control circuit block in the plasma display device.
Figure 9:
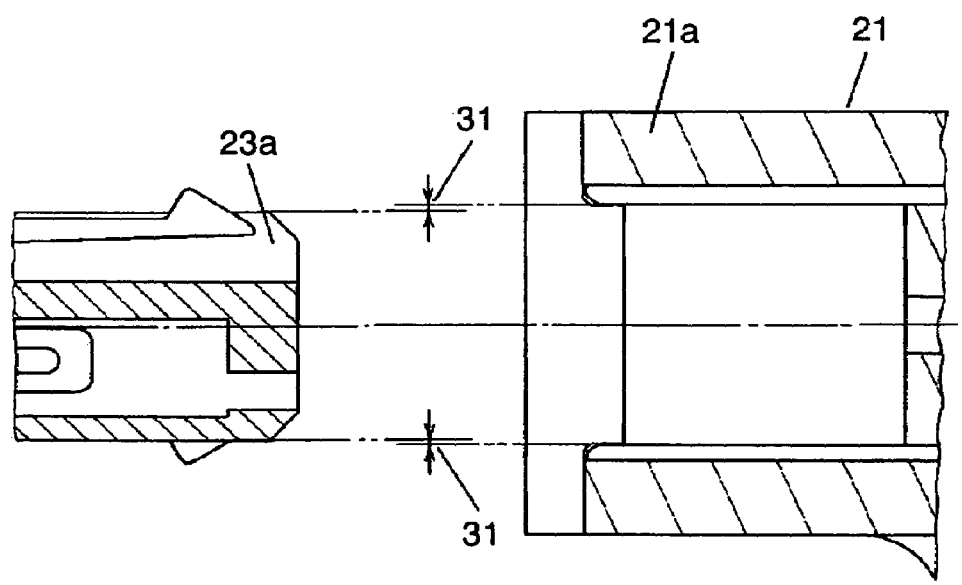
FIG. 9 is another sectional view wherein the connecting portion of FIG. 8 is further enlarged.
Figure 10:
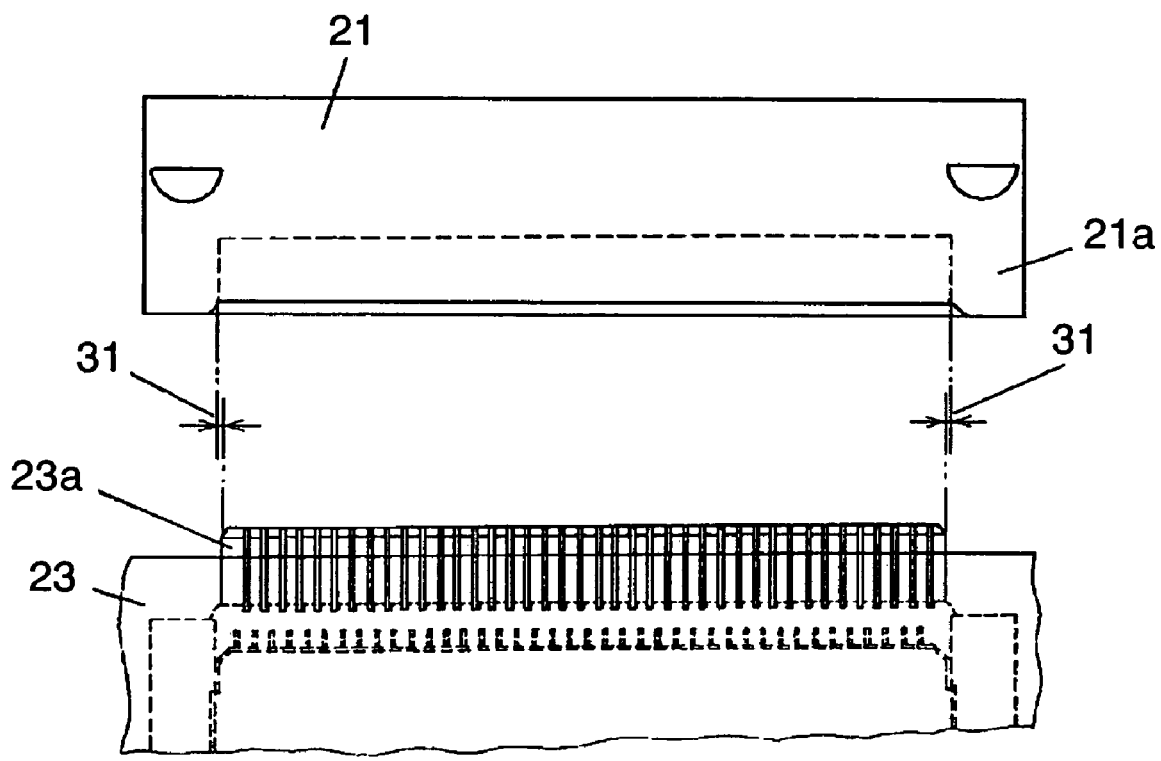
FIG. 10 is an enlarged plan view showing the connecting portion between the connector of the board block and the connector of the control circuit block in the plasma display device.

FIG. 8 is an enlarged sectional view showing a portion where one of connectors 23*a* and 24*a* of board blocks 23 and 24 is connected to connector 21 of control circuit block 13. FIG. 9 is another sectional view wherein the connecting portion of FIG. 8 is further enlarged. FIG. 10 is an enlarged plan view showing the connecting portion between one of connectors 23*a* and 24*a* of board block 23 and 24 and connector 21 of control circuit block 13.

Connector 21 for signal input of control circuit block 13 is a female connector, and this connector 21 includes casing 21*a* and terminal conductors 21*b*. Any of connectors 23*a* and 24*a* for signal output of board blocks 23 and 24 is inserted into casing 21*a*. Terminal conductors 21*b* are placed in casing 21*a*, and they come into electrical contact with terminal conductors of any of connectors 23*a* and 24*a* of board blocks 23 and 24.

Casing 21*a* is so formed that its interior dimensions are larger than exterior dimensions of connectors 23*a* and 24*a* of board blocks 23 and 24, as shown in FIG. 9 and FIG. 10. In other words, there are clearances 31 to give play between the two connectors.

As described above, board blocks 23 and 24 are provided with signal output connectors 23*a* and 24*a* for detachably connecting with signal input connectors 21 of the display drive circuit block. Casing member 22 has insertion opening 22*a* for installation of board blocks 23 and 24, and guide rails 25 for guiding and positioning board blocks 23 and 24 when these board blocks 23 and 24 are inserted through insertion opening 22*a*. Board blocks 23 and 24 are prepared as units of predetermined dimensions based on the smallest unit size, and guide rails 25 are mounted in a plural number of pieces corresponding to board blocks 23 of the smallest size.

According to the exemplary embodiment of this invention, board blocks 23, 24 and casing member 22 are constructed as described above, and these detachable board blocks 23 and 24 are mounted to casing member 22 to compose input signal circuit block 14. Board blocks of plural kinds, each having a signal processing circuit of different form, are therefore prepared in advance. The invention thus provides the plasma display device having the structure of signal input terminals corresponding to an intended application of its user, thereby making it adaptable to a variety of video signals by simply replacing any of board blocks 23 and 24 in input signal circuit block 14 according to the intended use.

Moreover, according to this exemplary embodiment of the invention, casing member 22 for detachably housing board blocks 23 and 24 is mounted to chassis member 5 in the orientation generally in parallel to display panel 1. This invention can therefore avoid the entire device from needlessly increasing in thickness, since input signal circuit block 14 consisting of casing member 22 and board blocks 23 and 24 can be placed within a space of depth available on the back side of the plasma display device.

Furthermore, board blocks 23 and 24 have guide plates 28 disposed to circuit boards 26 and 27 which carry the components composing the input signal circuits. Casing member 22 for housing board blocks 23 and 24 also has guide rails 25 disposed to the inner wall thereof to fit with guide plates 28 for positioning board blocks 23 and 24. Adoption of this structure facilitates positioning of board blocks 23 and 24, and smooth installation of them into casing member 22.

In addition, connector 21 for signal input includes casing 21*a* for receiving therein any of signal output connectors 23*a* and 24*a* of board blocks 23 and 24, and terminal conductors 21*b* for making electrical contact with terminal conductors in any of connectors 23*a* and 24*a* of board block 23 and 24. There are clearances 31 provided between casing 21*a* and connectors 23*a* and 24*a* of board blocks 23 and 24. In the case of connecting a plurality of board blocks such as board block 24 having two connectors 24*a*, for instance, the structure constructed as above facilitates coupling of connectors 24*a* smoothly into connectors 21 when board block 24 is installed into casing member 22, even if there is a deviation in mounting positions of connectors 24*a*. It can thus alleviate undue forces applied to connectors 24*a* and prevent them from being damaged.

Figure 11:
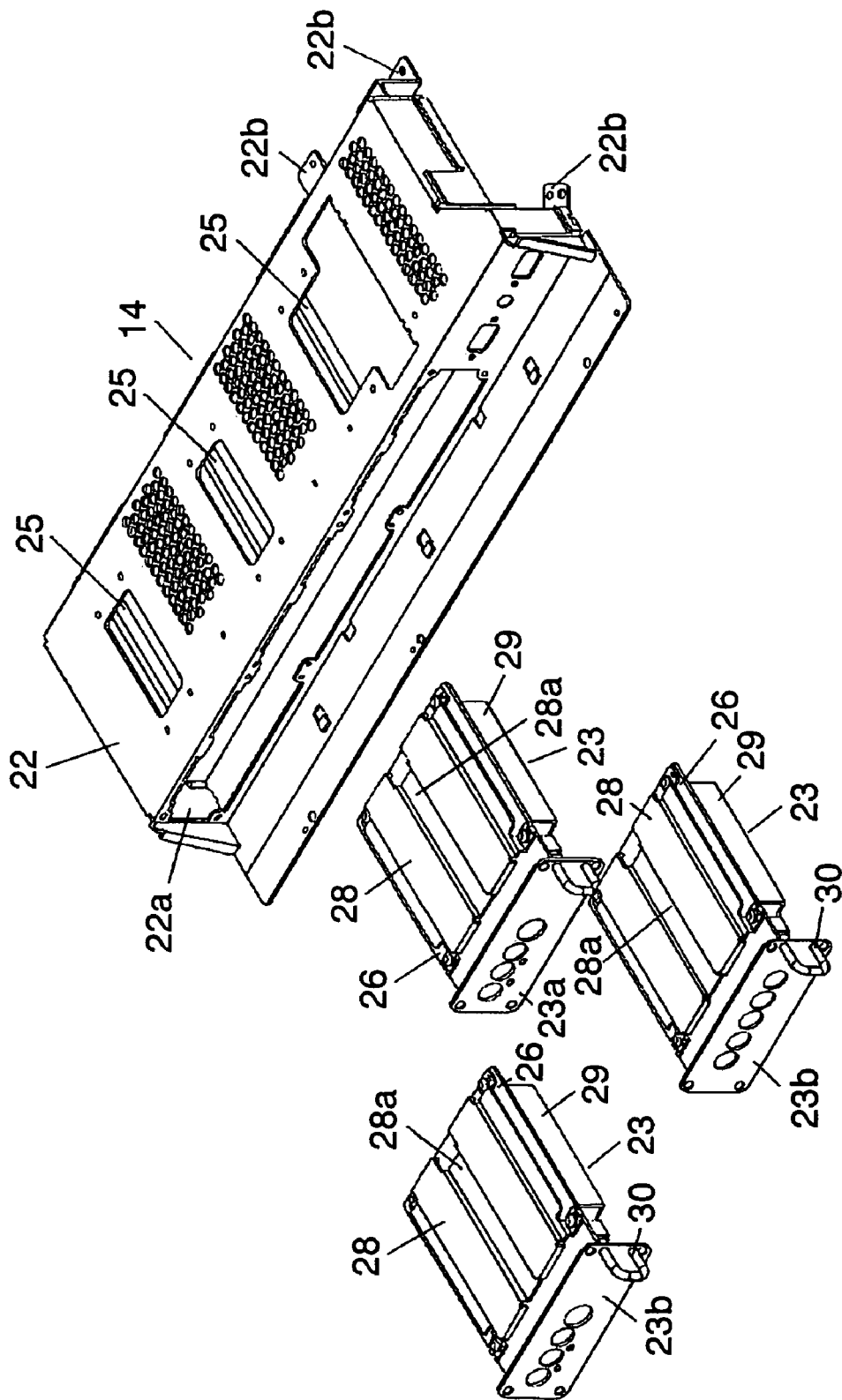
FIG. 11 is a perspective view showing another example of an input signal circuit block before being assembled in the plasma display device according to this exemplary embodiment of the invention.

In this exemplary embodiment, the combination of board blocks 23 and 24 described above is only an example, and this invention shall not be limited to the above structure. FIG. 11 is a perspective view showing another example of the input signal circuit block before being assembled in the plasma display device according to this exemplary embodiment of the invention. As shown in FIG. 11, input signal circuit block 14 can be composed by installing three sets of board block 23 of the smallest unit size into casing member 22.

Figure 12:
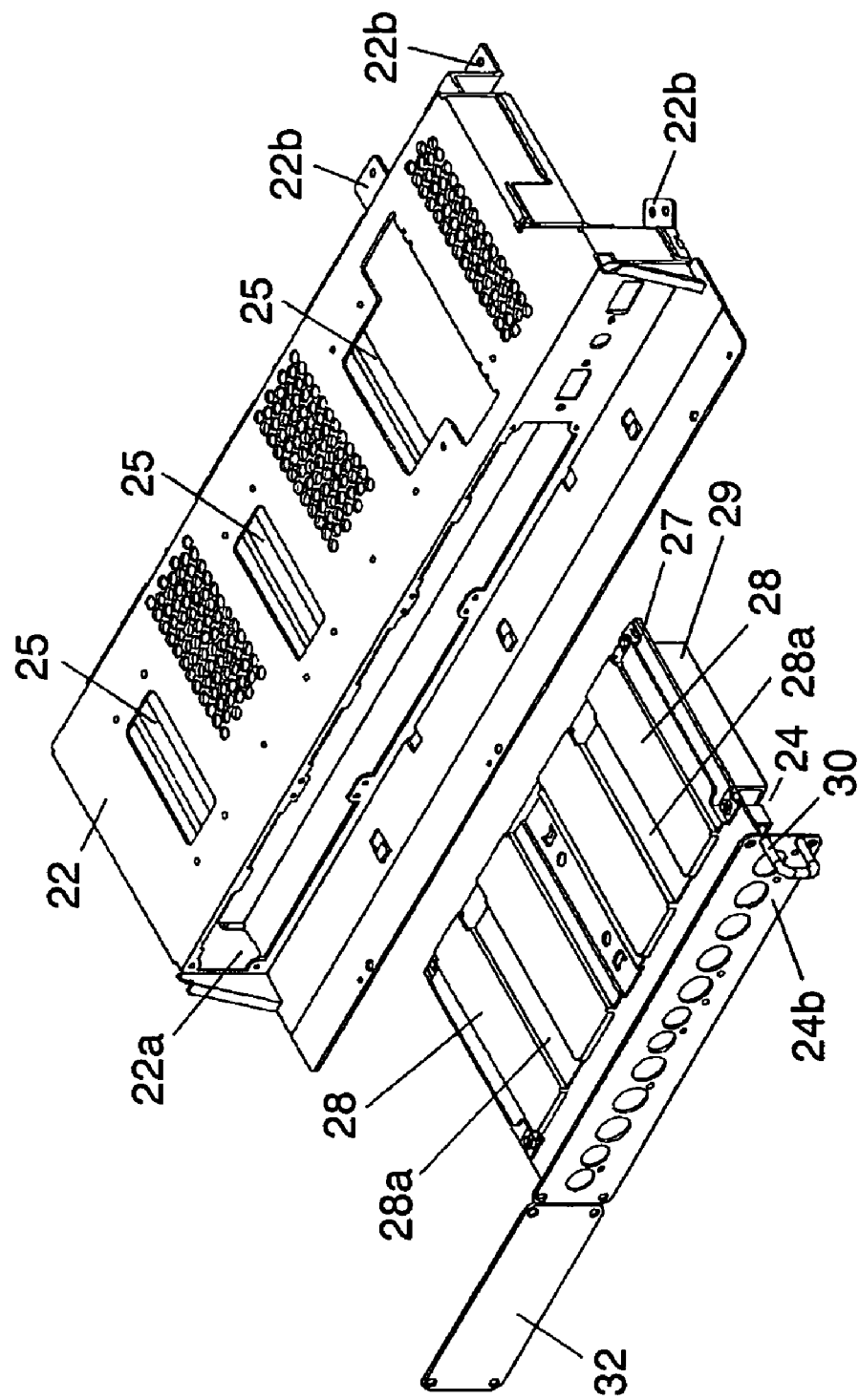
FIG. 12 is a perspective view showing still another example of an input signal circuit block before being assembled in the plasma display device according to this exemplary embodiment of the invention.

FIG. 12 is a perspective view showing still another example of the input signal circuit block before being assembled in the plasma display device according to this exemplary embodiment of the invention. Input signal circuit block 14 can also be composed by installing into casing member 22 only one board block 24 constructed of two combined board blocks of the smallest size, as shown in FIG. 12. In the example shown in FIG. 12, a part of insertion opening 22a in casing member 22 remains open, since there is only one board block 24 installed in casing member 22. Cover 32 is therefore mounted to close the opening.

Figure 13:
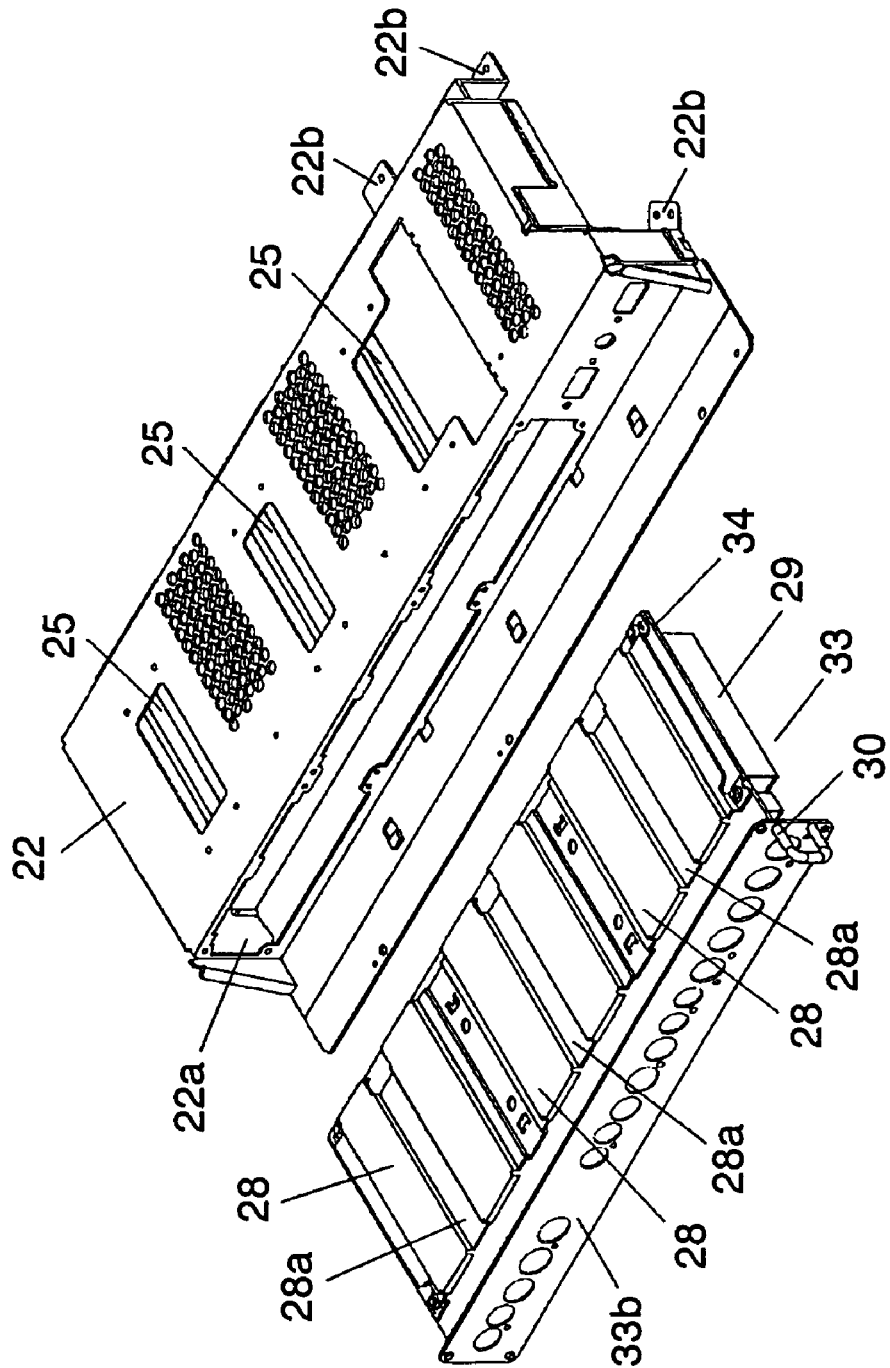
FIG. 13 is a perspective view showing yet another example of an input signal circuit block before being assembled in the plasma display device according to this exemplary embodiment of the invention.

FIG. 13 is a perspective view showing yet another example of the input signal circuit block before being assembled in the plasma display device according to this exemplary embodiment of the invention. Input signal circuit block 14 may also be composed by installing into casing member 22 board block 33 constructed of three combined board blocks of the smallest size, as shown in FIG. 13. Board block 33 is similar in structure to board blocks 23 and 24 except for the sizes and numbers of certain components, such that it is provided with three guide plates 28, input terminal section 33b having dimensions nearly equal to insertion opening 22a, and the like. Circuit board 34 is also similar in structure to circuit boards 26 and 27.

INDUSTRIAL APPLICABILITY

As described above, the present invention provides an advantageous effect of obtaining an image display unit having a structure of signal input terminal that is adaptable according to an intended application of the user by simply replacing a board block in the input signal circuit block.

The invention claimed is:

1. A flat panel image display unit comprising:
   a flat display panel;
   a display drive circuit block disposed to a chassis member for supplying a signal to the display panel for making display;
   an input signal circuit block for outputting a video signal to the display drive circuit block; and
   an enclosure for housing the display panel, the display drive circuit block and the input signal circuit block,
   wherein the input signal circuit block includes a plurality of different kinds of board blocks provided replaceably according to a plurality of different forms of signals, the board block having a signal output connector detachably connectable to a signal input connector of the display drive circuit block, and
   a casing member placed inside the enclosure and provided with an insertion opening for accepting insertion of any of the board blocks and a guide rail for guiding and positioning the board block to a predetermined position when the board block is inserted through the insertion opening, and
   wherein the plurality of board blocks are prepared in predetermined dimensions as a smallest unit size, and the plurality of guide rails are disposed to the casing member according to dimensions of the board block of the smallest unit size.

2. The flat panel image display unit according to claim 1, wherein the board block is provided with an input terminal for detachably connecting a coupling cable for connection of an external apparatus.

3. The flat panel image display unit according to claim 1, wherein the plurality of guide rails are disposed at regular intervals.

4. The flat panel image display unit according to claim 1, wherein the casing member is placed within the enclosure so as to be in substantially parallel to the display panel.

5. The flat panel image display unit according to claim 1, wherein the board block has a guide plate disposed to a circuit board carrying components composing an input signal circuit, and the guide rail is disposed to an inner wall of the casing member for fitting the guide plate of the board block.

6. The flat panel image display unit according to claim 1, wherein the signal input connector includes a casing for receiving therein the signal output connector of the board block, and a terminal conductor placed inside the casing for making electrical contact with a terminal conductor of the signal output connector of the board block, and
   wherein a clearance is provided between the casing and the signal output connector of the board block.

* * * * *